(12) United States Patent
Liu

(10) Patent No.: US 11,263,623 B1
(45) Date of Patent: Mar. 1, 2022

(54) METHOD AND APPARATUS FOR GROUPING TRANSACTIONS IN BLOCKCHAIN

(71) Applicant: Alipay (Hangzhou) Information Technology Co., Ltd., Zhejiang (CN)

(72) Inventor: Xiaojian Liu, Zhejiang (CN)

(73) Assignee: Alipay (Hangzhou) Information Technology Co., Ltd., Hangzhou (CN)

(*) Notice: Subject to any disclaimer, the term of this patent is extended or adjusted under 35 U.S.C. 154(b) by 0 days.

(21) Appl. No.: 17/364,021

(22) Filed: Jun. 30, 2021

(30) Foreign Application Priority Data

Aug. 28, 2020 (CN) .................... CN202010889817.4

(51) Int. Cl.
| | |
|---|---|
| *G06F 7/00* | (2006.01) |
| *G06Q 20/38* | (2012.01) |
| *G06F 16/28* | (2019.01) |
| *G06F 16/23* | (2019.01) |
| *G06F 16/13* | (2019.01) |

(52) U.S. Cl.
CPC ... *G06Q 20/38215* (2013.01); *G06F 16/2379* (2019.01); *G06F 16/285* (2019.01); *G06Q 20/389* (2013.01); *G06Q 20/3827* (2013.01); *G06F 16/137* (2019.01); *G06F 16/2365* (2019.01)

(58) Field of Classification Search
CPC ........... G06Q 20/38215; G06Q 20/389; G06Q 20/3827; G06F 16/2379; G06F 16/137; G06F 16/2365; G06F 16/285

USPC ................................................. 707/600–899
See application file for complete search history.

(56) References Cited

U.S. PATENT DOCUMENTS

| | | | |
|---|---|---|---|
| 9,858,303 B2 | 1/2018 | Bhattacharjee et al. | |
| 2017/0212781 A1 | 7/2017 | Dillenberger et al. | |
| 2017/0302450 A1 | 10/2017 | Ebrahimi | |
| 2018/0240062 A1 | 8/2018 | Crabtree et al. | |
| 2019/0281065 A1 | 9/2019 | Xia et al. | |
| 2020/0034469 A1* | 1/2020 | Sato | G06F 16/2471 |

FOREIGN PATENT DOCUMENTS

| | | |
|---|---|---|
| CN | 102629234 A | 8/2012 |
| CN | 106095745 A | 11/2016 |
| CN | 106656974 A | 5/2017 |
| CN | 109598598 A | 4/2019 |

(Continued)

*Primary Examiner* — Isaac M Woo
(74) *Attorney, Agent, or Firm* — Seed IP Law Group LLP

(57) ABSTRACT

Implementations of the present specification provide a method and an apparatus for grouping transactions in a blockchain. The method includes: obtaining a first transaction in multiple transactions; obtaining a first variable accessed in the first transaction; reading a first value of a first belonging variable corresponding to the first variable; reading a first value of a first associated variable corresponding to the first transaction; if the first value of the first belonging variable is a numbering value of a second transaction in the multiple transactions, recording an association relationship between the first transaction and the second transaction in the associative array by performing an atomic comparative change operation on an atomic variable in an associative array; and grouping the multiple transactions based on the associative array.

20 Claims, 7 Drawing Sheets

(56) References Cited

FOREIGN PATENT DOCUMENTS

| CN | 110517140 | A | 11/2019 |
|----|-----------|---|---------|
| CN | 110535825 | A | 12/2019 |
| CN | 110728578 | A | 1/2020  |
| CN | 111047449 | A | 4/2020  |
| CN | 111475262 | A | 7/2020  |
| CN | 111563093 | A | 8/2020  |

* cited by examiner

METHOD AND APPARATUS FOR GROUPING TRANSACTIONS IN BLOCKCHAIN

BACKGROUND

Technical Field

Implementations of the present specification relate to the field of blockchain technologies, and more specifically, to a method and an apparatus for grouping transactions in a blockchain.

Description of the Related Art

The blockchain technology is also referred to as a distributed ledger technology, and all the full nodes in the blockchain have full and consistent data. To ensure that all the full nodes have consistent data, concurrent processing is performed on multiple transactions in the blockchain on the premise that there is no data dependency between the concurrently executed transactions. For example, in a Hyperledger Fabric blockchain (hereinafter referred to as a Fabric blockchain), an endorser pre-executes each transaction to generate a read-write set of each transaction. The read-write set includes a variable read or written in the process of pre-executing the transaction. When a committer in the Fabric blockchain performs validation on a block, the committer executes transactions in the block, and determines whether a read-write set of each transaction in the block can be successfully executed based on a current world state. If the read-write set of each transaction in the block can be successfully executed, the world state is changed accordingly. Therefore, if no read-write conflict exists between accessed variables of two transactions, the change of the world state caused by one transaction does not affect execution of the other transaction, so the two transactions can be concurrently executed. If a read-write conflict exists between accessed variables of two transactions, the two transactions can only be serially executed.

Before a batch of transactions are executed, transactions with overlapping read-write sets are placed in the same group based on an overlapping relationship between read-write sets of the transactions, which can ensure that there is no data dependency between transactions in different groups. In traditional solutions, a single thread groups transactions based on overlapping between read-write sets of transactions. When there are tens of thousands of transactions to be grouped, hundreds of milliseconds are needed for the grouping algorithm, which greatly restricts the throughput rate of the whole system.

BRIEF SUMMARY

Implementations of the present specification provide a more effective solution for grouping transactions in a blockchain, which overcomes deficiencies in the existing technologies.

One aspect of the present specification provides a method for grouping transactions in a blockchain, including: obtaining a first transaction in multiple transactions; obtaining a first variable accessed in the first transaction; reading a first value of a first belonging variable corresponding to the first variable, the first belonging variable being stored in a shared memory and being configured to record a numbering value of a transaction associated with a transaction to which the first variable belongs; reading a first value of a first associated variable corresponding to the first transaction, the first associated variable being an atomic variable included in an associative array, the associative array including multiple atomic variables respectively corresponding to the multiple transactions and being stored in the shared memory, and the first associated variable being configured to record a numbering value of a transaction associated with the first transaction; in response to the first value of the first belonging variable being a numbering value of a second transaction in the multiple transactions, recording an association relationship between the first transaction and the second transaction in the associative array by performing an atomic comparative change operation on an atomic variable in the associative array based on the first value of the first belonging variable and the first value of the first associated variable; and grouping the multiple transactions based on the associative array.

In an implementation, the first belonging variable is an atomic variable, and the method further includes: in response to the first value of the first belonging variable being a predetermined null value, performing atomic operations including: reading a second value of the first belonging variable; changing a value of the first belonging variable to the first value of the first associated variable in response to the second value of the first belonging variable being the predetermined null value; and returning the second value of the first belonging variable in response to the second value of the first belonging variable not being a predetermined null value.

In an implementation, the performing the atomic comparative change operation on the atomic variable in the associative array based on the first value of the first belonging variable and the first value of the first associated variable includes: reading a first value of a second associated variable corresponding to the second transaction in response to the first value of the first associated variable being greater than the first value of the first belonging variable, and in response to the first value of the second associated variable being the numbering value of the second transaction, performing atomic operations including: reading a second value of the second associated variable; changing a value of the second associated variable to the first value of the first associated variable in response to the second value of the second associated variable being the numbering value of the second transaction; and returning the second value of the second associated variable in response to the second value of the second associated variable not being the numbering value of the second transaction.

In an implementation, the method further includes: in response to the first value of the first associated variable being greater than the first value of the first belonging variable, performing atomic operations including: reading a third value of the first belonging variable; changing a value of the first belonging variable to the first value of the first associated variable in response to the third value of the first belonging variable being the first value of the first belonging variable; and returning the third value of the first belonging variable in response to the third value of the first belonging variable not being the first value of the first associated variable In an implementation, the performing the atomic comparative change operation on the atomic variable in the associative array based on the first value of the first belonging variable and the first value of the first associated variable includes: in response to the first value of the first associated variable being less than the first value of the first belonging variable, and in response to the first value of the first associated variable being a numbering value of the first transaction, performing atomic operations including: reading a second value of the first associated variable; changing a value of the first associated variable to the numbering value of the second transaction in response to the second value of the first associated variable being the numbering value of the first transaction; and returning the second value of the first associated variable in response to the second value of the first associated variable not being equal to the numbering value of the first transaction.

In an implementation, the second value of the first associated variable is a numbering value of a third transaction, and the method further includes: after the second value of the first associated variable has been returned, recording an association between the third transaction and the second transaction in the associative array by performing an atomic comparative change operation on an atomic variable in the associative array based on the second value of the first associated variable and the first value of the first belonging variable.

Another aspect of the present specification provides an apparatus for grouping transactions in a blockchain, including: a first acquisition unit, configured to obtain a first transaction in multiple transactions; a second acquisition unit, configured to obtain a first variable accessed in the first transaction; a first reading unit, configured to read a first value of a first associated variable corresponding to the first variable, the first associated variable being stored in a shared memory and being configured to record a numbering value of a transaction associated with a transaction to which the first variable belongs; a second reading unit, configured to read a first value of a first associated variable corresponding to the first transaction, the first associated variable being an atomic variable included in an associative array, the associative array including multiple atomic variables respectively corresponding to the multiple transactions and being stored in the shared memory, and the first associated variable being configured to record a numbering value of a transaction associated with the first transaction; a first recording unit, configured to: in response to the first value of a first belonging variable being a numbering value of a second transaction in the multiple transactions, record an association relationship between the first transaction and the second transaction in the associative array by performing an atomic comparative change operation on an atomic variable in the associative array based on the first value of the first belonging variable and the first value of the first associated variable; and a grouping unit, configured to group the multiple transactions based on the associative array.

In an implementation, the first belonging variable is an atomic variable, and the apparatus further includes a first operation unit, configured to: in response to the first value of the first belonging variable being a predetermined null value, perform atomic operations including: reading a second value of the first belonging variable; changing a value of the first belonging variable to the first value of the first associated variable in response to the second value of the first belonging variable being the predetermined null value; and returning the second value of the first belonging variable in response to the second value of the first belonging variable not being the predetermined null value.

In an implementation, the first recording unit includes: a reading subunit, configured to read a first value of a second associated variable corresponding to the second transaction in response to the first value of the first associated variable being greater than the first value of the first belonging variable; and a first operation subunit, configured to: in response to the first value of the second associated variable being the numbering value of the second transaction, perform atomic operations including: reading a second value of the second associated variable; changing a value of the second associated variable to the first value of the first associated variable in response to the second value of the second associated variable being the numbering value of the second transaction; and returning the second value of the second associated variable in response to the second value of the second associated variable not being the numbering value of the second transaction.

In an implementation, the apparatus further includes a second operation unit, configured to: in response to the first value of the first associated variable being greater than the first value of the first belonging variable, perform atomic operations including: reading a third value of the first belonging variable; changing a value of the first belonging variable to the first value of the first associated variable in response to the third value of the first belonging variable being the first value of the first belonging variable; and returning the third value of the first belonging variable in response to the third value of the first belonging variable not being the first value of the first associated variable.

In an implementation, the first recording unit includes a second operation subunit, configured to: in response to the first value of the first associated variable being less than the first value of the first belonging variable, and in response to the first value of the first associated variable being a numbering value of the first transaction, perform atomic operations including: reading a second value of the first associated variable; changing a value of the first associated variable to the numbering value of the second transaction in response to the second value of the first associated variable being the numbering value of the first transaction; and returning the second value of the first associated variable in response to the second value of the first associated variable not being equal to the numbering value of the first transaction.

In an implementation, the second value of the first associated variable is a numbering value of a third transaction, and the apparatus further includes a second recording unit, configured to record an association between the third transaction and the second transaction in the associative array by performing an atomic comparative change operation on an atomic variable in the associative array based on the second value of the first associated variable and the first value of the first belonging variable.

An aspect of the present specification provides a computer-readable storage medium. The computer-readable storage medium stores computer programs, and a computer performs any one of the above methods when the computer programs are executed on the computer.

An aspect of the present specification provides a computing device, including a storage and a processor. The storage stores executable code, and the processor implements any one of the above methods when executing the executable code.

In the solution for grouping transactions in a blockchain according to the implementations of the specification, multiple threads can concurrently change a belonging array and an associative array in a lock-free way, so that multiple transactions can be grouped based on the associative array. In this process, no search for a complex data structure is involved, and the full advantage of multi-CPU performance can be taken.

BRIEF DESCRIPTION OF THE SEVERAL VIEWS OF THE DRAWINGS

By describing the implementations of the present specification with reference to the accompanying drawings, the implementations of the present specification can be made clearer.

DETAILED DESCRIPTION

The following describes the implementations of the present specification with reference to the accompanying drawings.

Figure 1:
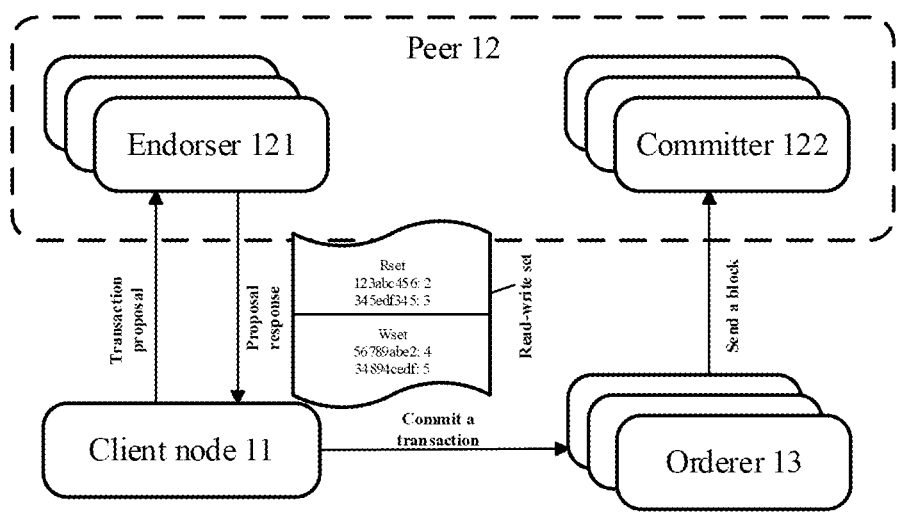
FIG. 1 is a schematic structural diagram illustrating a Fabric blockchain.

FIG. 1 is a schematic structural diagram illustrating a Fabric blockchain. The Fabric blockchain is an enterprise-oriented consortium blockchain. As shown in FIG. 1, the Fabric blockchain includes the following multiple types of nodes: a client node 11, peers 12, an orderer 13, etc. The peers 12 further include an endorser 121, a committer 122, etc. The Fabric blockchain includes multiple channels. Each channel has closed ledger data and a chain code of the channel. The chain code is a smart contract in the Fabric blockchain. The peer 12 can choose which channels to join, and the peer 12 can join the channel after the identity of the peer 12 is verified by a peer existing in the channel.

As shown in FIG. 1, the client node 11 can initiate a transaction proposal to a certain channel in the Fabric blockchain, so that the client node 11 sends a transaction proposal to at least two endorsers 121 in the channel. The endorser 121 in the channel has a transaction proposal system interface, so that the endorser can pre-execute and digitally sign the transaction proposal received from the client node by invoking the system interface, and return a pre-execution result and a digital signature to the client node 11 after pre-execution. The pre-execution result is a read-write set in the transaction pre-execution process. FIG. 1 shows an example of the read-write set. The read-write set includes a read set (Rset) and a write set (Wset). The read set is a variable value read by the endorser in the transaction pre-execution process, and is recorded in the form of a key-value pair. As shown in FIG. 1, "123abc456:2" in the read set indicates that the value of the read variable 123abc456 (Key) is 2, where 123abc456 is a variable name. The write set is a value pre-written to a variable by the endorser in the transaction pre-execution process, that is, the writing to the variable is only recorded in the write set without changing a world state. Similarly, the write set is also recorded in the form of a key-value pair.

After receiving a transaction pre-execution result and a signature from each endorsement node 121, the client node 11 sends transaction information to the orderer 13 to commit the transaction, where the transaction information includes the transaction proposal of the transaction, the transaction pre-execution result, and the signature. The orderer 13 is configured to sort transactions, pack sorted transactions in a block at fixed intervals, and send the block to each committer 122 in the blockchain. After receiving the block, the committer 122 executes the transaction, that is, verifies, based on the world state, whether the read-write set of each transaction in the block can be successfully executed, marks the execution state (i.e., success or failure) of the read-write set in each transaction of the block, and then adds the block to ledger data of the current node (i.e., committing the block).

For example, the block includes sequentially arranged transaction 1 and transaction 2, transaction 2 is a later transaction, transaction 2 includes reading variable 123abc456, and transaction 1 includes writing variable 123abc456. Because the world state is not changed when each transaction is pre-executed, that is, the value of variable 123abc456 is not changed when transaction 1 is pre-executed, and the value of variable 123abc456 is changed after the committer executes transaction 1. Therefore, the value of variable 123abc456 read when transaction 2 is pre-executed is different from the value of variable 123abc456 read when transaction 2 is executed. In this case, the committer 122 determines that a read-write set of transaction 2 cannot be successfully executed. It can be learned from this example that when the same variable is recorded in read-write sets of transaction 1 and transaction 2, it can be determined that a read-write conflict exists between transaction 1 and transaction 2, and therefore, transaction 1 and transaction 2 need to be serially executed based on a sequence of transaction 1 and transaction 2. If the same variable is not recorded in read-write sets of two transactions, no read-write conflict exists. In this case, the two transactions can be concurrently executed. In other words, to determine whether transactions can be concurrently executed, it needs to be determined whether the same variable is recorded in read-write sets of the transactions. In this implementation of the present specification, multiple threads concurrently change a variable belonging array and a transaction associative array, determine an overlapping relationship between read-write sets of all the transactions for variable access based on the transaction associative array, and place transactions with overlapping read-write sets in one group, which can ensure that there is no data dependency between transactions in different groups, so that transactions in each group are concurrently executed.

Figure 2:
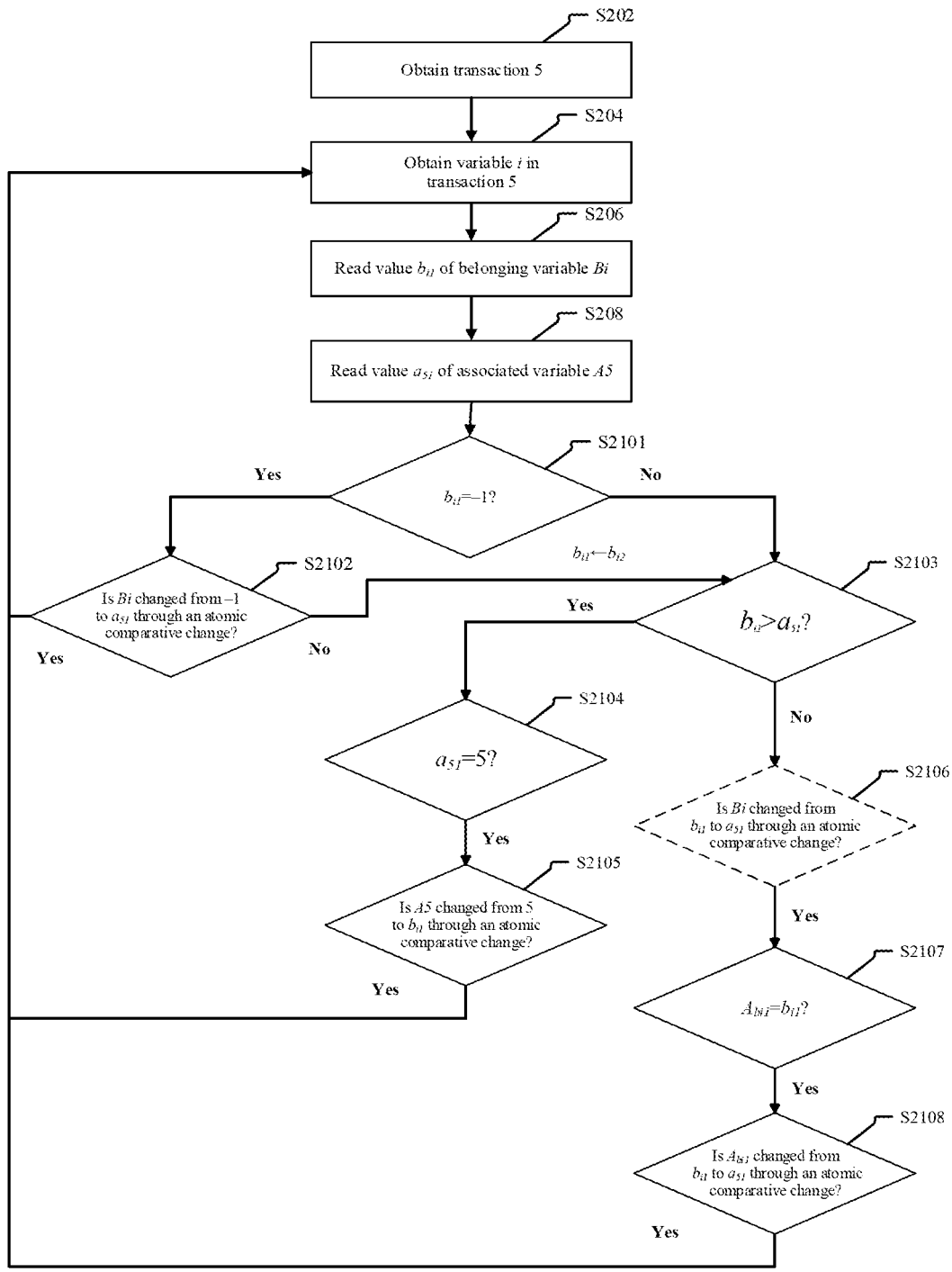
FIG. 2 is a flowchart illustrating a method for grouping transactions in a blockchain according to an implementation of the present specification.

FIG. 2 is a flowchart illustrating a method for grouping transactions in a blockchain according to an implementation of the present specification. The method includes the following steps.

Step S202: Obtain transaction 5 in multiple transactions.

Step S204: Obtain variable i accessed in transaction 5.

Step S206: Read value $b_{i_1}$ of belonging variable Bi corresponding to variable i, where belonging variable Bi is stored in a shared memory and is configured to record the numbering value of a transaction to which variable i belongs.

Step S208: Read value $a_{5_1}$ of associated variable A5 corresponding to transaction 5, where associated variable A5 is an atomic variable included in an associative array, the associative array includes multiple atomic variables $A_j$ respectively corresponding to the multiple transactions and is stored in the shared memory, and associated variable A5 is configured to record the numbering value of a transaction associated with transaction 5.

Steps S2101 to S2108: Record an association relationship between all transactions in the associative array.

The method shown in FIG. 2 is performed by one of multiple threads in a blockchain node device, and the multiple threads can concurrently perform the method shown in FIG. 2, to improve the efficiency of grouping multiple transactions. The multiple transactions are multiple transactions to be executed, for example, for multiple transactions in one block in the blockchain, the multiple transactions have transaction numbers (or numbering values of transactions), and the transaction numbers/numbering values of transactions are determined based on a predetermined rule, for example, based on the amount of gas provided by the transactions, or a time sequence for proposing transaction proposals of the transactions. The transaction numbers are used to indicate a sequence of committing the transactions. For example, transaction 1 should be committed before transaction 2.

The following describes the above steps in detail.

First, in step S202, transaction 5 in the multiple transactions is obtained.

To enable multiple threads to concurrently group the multiple transactions, each thread can obtain an unprocessed transaction from the multiple transactions to separately record, for the transaction, a transaction to which a variable belongs and an association between transactions in the belonging array and the associative array according to this implementation of the present specification, so as to group the multiple transactions. As described above, the method shown in FIG. 2 is performed by any one of the multiple threads. For example, the thread obtains transaction 5 from the multiple transactions for processing.

Figure 3:
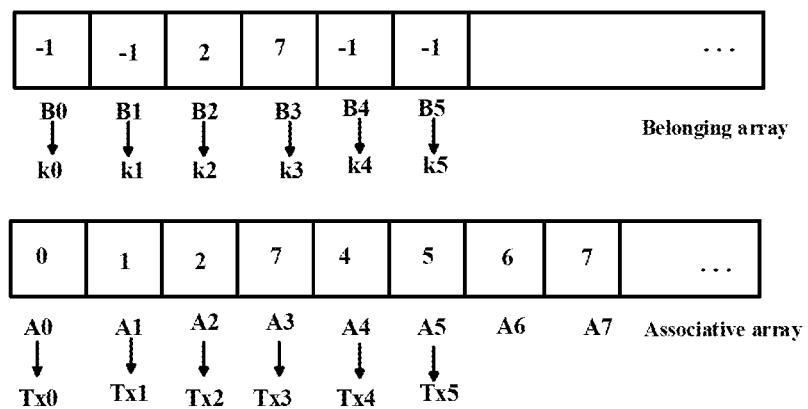
FIG. 3 is a schematic diagram illustrating a belonging array and an associative array according to an implementation of the present specification.

FIG. 3 is a schematic diagram illustrating a belonging array and an associative array according to an implementation of the present specification. The belonging array and the associative array are set in the shared memory of the node device, so that the multiple threads can concurrently change the belonging array and the associative array. For example, as shown in FIG. 3, the belonging array includes multiple belonging variables, shown as B0 to B5 in FIG. 3, and each belonging variable is an atomic variable used for the subsequent atomic operation. The atomic variable is a basic unit of the atomic operation, the atomic variable can ensure that a series of atomic operations is not interrupted, which ensures the security of the thread operation. The atomic operation refers to an operation that is not interrupted by a thread scheduling mechanism. Such an operation is performed until the end once the operation starts, without switching to another thread in between. Each belonging variable corresponds to one variable accessed in the multiple transactions. For example, as shown in FIG. 3, B0 corresponds to k0. k0 is an identifier of variable k0, for example, k0 can be a variable name of variable k0, or k0 can be the numbering value of variable k0. The value of a belonging variable is used to indicate the numbering value of a transaction to which a variable accessed in a transaction belongs or the numbering value of an associated transaction of a transaction to which a variable belongs. Before the multiple threads start to perform the method shown in FIG. 2, the value of each belonging variable is predetermined as a predetermined null value (e.g., "−1" in FIG. 3) to indicate that the variable does not belong to any transaction. As shown in FIG. 3, in the belonging array, the value of B2 is 2, indicating that transaction 2 or an associated transaction of transaction 2 includes access to variable k2, in other words, variable k2 belongs to transaction 2 or the associated transaction of transaction 2. The value of B3 is 7, indicating that transaction 7 or an associated transaction of transaction 7 includes access to variable k3, in other words, variable k3 belongs to transaction 7 or the associated transaction of transaction 7. It can be understood that although multiple belonging variables respectively corresponding to the transactions accessed in the multiple transactions are shown in the form of belonging array, the present specification is not limited thereto. For example, a name hash value of a variable accessed in a transaction is used as a belonging variable address of the variable. In other words, in this case, each transaction variable has a scattered belonging variable address.

Still as shown in FIG. 3, the associative array includes multiple associated variables. A0 to A7 are shown as examples in FIG. 3. Each associated variable is an atomic variable used for the subsequent atomic operation. Each associated variable corresponds to one transaction. For example, as shown in FIG. 3, A0 corresponds to transaction Tx0, where 0 in Tx0 is a transaction numbering value. The value of the associated variable is used to indicate an associated transaction of a transaction corresponding to the associated variable, that is, the two transactions access the same variable. In this implementation, it is specified that for two associated transactions, the numbering value of a transaction with a larger transaction numbering value is recorded in an associated variable of a transaction with a smaller transaction numbering value, so as to indicate the association between the two transactions. For example, as shown in FIG. 3, 7 is recorded in A3, indicating transaction 3 is associated with transaction 7. It can be understood that this implementation of the present specification is not limited thereto. For example, it can also be specified that the numbering value of a smaller associated transaction is recorded in an associated variable of a larger transaction. Before the multiple threads start to perform the method shown in FIG. 2, the value of each belonging variable is predetermined as a transaction numbering value of a corresponding transaction, to indicate that the corresponding transaction is not currently associated with a transaction.

In step S204, variable i accessed in transaction 5 is obtained.

Assume that variable k0 to variable k3 are accessed in transaction 5. In other words, for a Fabric blockchain, reading and/or writing variable k0 to variable k3 is recorded in a read-write set of transaction 5, and for an Ethereum blockchain, transaction 5 includes a change operation of account states of four accounts respectively corresponding to variable k0 to variable k3. Therefore, after obtaining transaction 5, the thread sequentially obtains the four variables, and performs processing separately. For example, the thread first obtains variable k0, and variable k0 corresponds to belonging variable B0 in the belonging array.

In step S206, value $b_{i_1}$ of belonging variable Bi corresponding to variable i is read.

For example, the thread reads the value "−1" of B0 corresponding to variable k0.

In step S208, value $a_{51}$ of associated variable A5 corresponding to transaction 5 is read.

For example, as shown in FIG. 3, the value of A5 corresponding to read transaction 5 (Tx5) is 5.

Then, step S2101 is performed to determine whether value $b_{01}$ of B0 is equal to −1.

When the determining result is "Yes," step S2102 is performed to change the value of B0 from −1 to 5 through an atomic comparative change, to indicate that variable k0 belongs to transaction 5. In this step, a processor is instructed to execute instruction atomic_cmp_xchg (&a, −1, 5) to perform the atomic comparative change, where &a, −1, and 5 are parameters input to the instruction, &a is a memory address of variable B0, −1 is the value before the change, and 5 is the value after the change. Execution of instruction atomic_cmp_xchg (&a, −1, 5) corresponds to an atomic operation. When the instruction is executed, the following process is performed: The value (i.e., $b_{01}$ in FIG. 2) of variable B0 is read, and it is determined whether the value of variable B0 is −1. If the value of variable B0 is −1, the value of variable B0 is changed to 5. If the read value of variable B0 is not −1, the read value of B0 is not changed and is returned.

If the change in step S2102 succeeds (corresponding to the branch marked with "Yes" at the box S2102 in FIG. 2), that is, the value of variable B0 is changed to 5, indicating that variable k0 belongs to transaction 5, the thread completes processing variable k0, and goes back to step S204 to obtain the next variable accessed in transaction 5. Herein, because no association relationship between transaction 5 and another transaction is involved, the associative array does not need to be changed.

If the change in step S2102 fails, current value $b_{02}$ of variable B0 is returned. In this case, $b_{i1}$ in step S2103 can be replaced with $b_{02}$ to perform subsequent steps. This situation indicates that before the thread performs step S2102, another thread has changed the value of variable B0 from −1 to the numbering value of another transaction in advance. Because the value of variable B0 is no longer −1, the atomic comparative change to B0 fails herein, and the current value of B0 is returned.

When step S2102 is successfully performed, the thread performs step S204 again to obtain a variable such as variable k1 in transaction 5, so as to perform step S206 to read the value ($b_{11}$) of atomic variable B1. For example, as shown in FIG. 3, the value −1 of B1 is read. Then step S208 is performed to read the value of A5. Assume that variable k0 is also accessed in another transaction (e.g., transaction 6), the value of A5 is changed to 6, indicating that transaction 5 is associated with transaction 6. In this case, the read value of A5 is 6. Therefore, when step S2102 is performed, the value of B1 is changed to the value 6 of A5 through an atomic comparative change, to indicate the associated transaction of transaction 5 to which variable k1 belongs.

After successfully processing variable k1, the thread performs step S204 again to obtain a variable such as variable k2 in transaction 5. For variable k2, after the thread performs step S206, for example, as shown in FIG. 3, the read value of B2 is 2, which indicates that variable k2 belongs to transaction 2 or an associated transaction of transaction 2. Variable k2 is also accessed in transaction 5, in other words, transaction 2 is associated with transaction 5. Therefore, the association between transaction 2 and transaction 5 needs to be recorded in the associative array.

Figure 4:
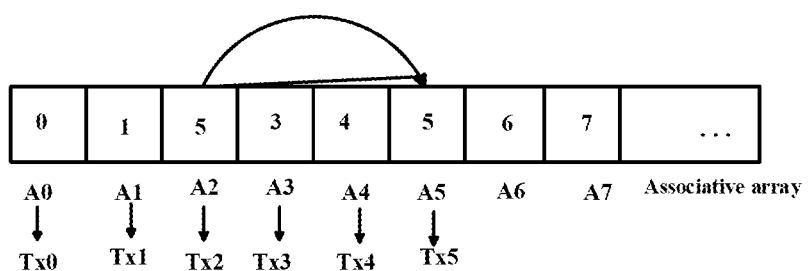
FIG. 4 is a schematic diagram illustrating an associative array after step S2108 is successfully performed.

For example, referring to FIG. 2, for variable k2, in step S208, the value (i.e., $a_{51}$) of variable A5 is read. Assume that the value of variable A5 read herein is 5, as shown in FIG. 3. It can be understood that because another thread may change the value of A5, in this implementation, the value of variable A5 can be a value greater than or equal to 5 (e.g., 6 or 7). When the value of variable A5 is greater than or equal to 5, a process the same as the following process is still performed. In step S2101, it is determined whether the value (i.e., $b_{21}$) of B2 is −1, where the value is 2 herein. Therefore, step S2103 is performed to determine whether $b_{21}$ is greater than $a_{51}$, where $b_{21}=2$ is less than $a_{51}=5$. Therefore, step S2107 is performed to read the value of A2 to determine whether the value of A2 is equal to 2. For example, the current associative array is shown in FIG. 3. That is, A2=2. In this case, step S2108 is performed to change A2 to 5 through an atomic comparative change. FIG. 4 is a schematic diagram illustrating an associative array after step S2108 is successfully performed. After the value of A2 is successfully changed to 5 through an atomic comparative change, the value 5 of A2 represents the association between transaction 2 and transaction 5, that is, as shown in FIG. 4, the value 5 of A2 represents a pointer pointing to transaction 5. In another situation, in step S2107, the read value of A2 is not equal to 2, for example, the value of A2 is 3. In other words, A2 has recorded an association relationship between transaction 2 and transaction 3. In this case, if the value of A2 is changed to 5, the recorded association relationship between transaction 2 and transaction 3 will be deleted. Therefore, the association relationship between transaction 2 and transaction 5 needs to be recorded in another way.

Figure 5:
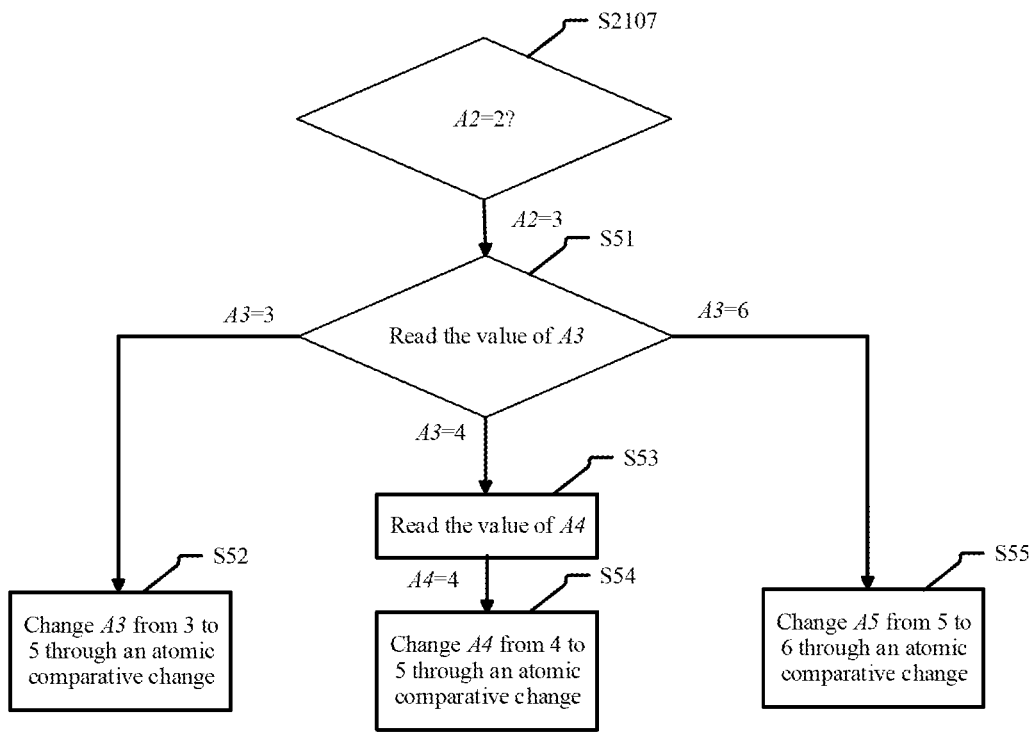
FIG. 5 shows three possible situations where an association relationship between two transactions is recorded in an associative array.

FIG. 5 shows three possible situations where an association relationship between transaction 2 and transaction 5 is recorded in an associative array when A2=3. When the determining result of step S2107 shown in FIG. 2 is "No," for example, A2=3 (i.e., A2≠2), step S51 in FIG. 5 is performed to read the value of variable A3 in the associative array. Each branch after step S51 is performed represents one situation where the association relationship between transaction 2 and transaction 5 is recorded in the associative array.

Figure 6:
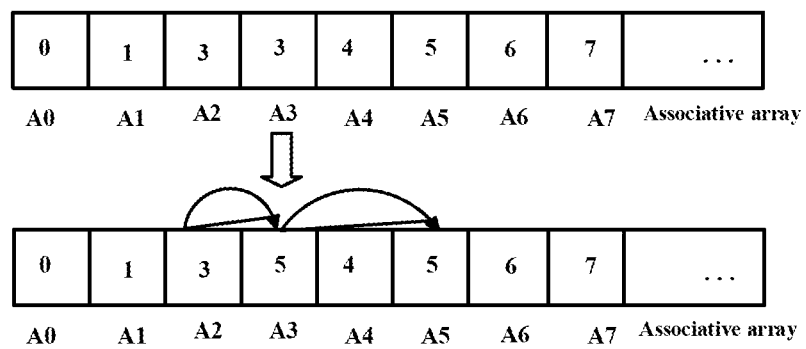
FIG. 6 shows a process of changing an associative array corresponding to the left branch in FIG. 5.

FIG. 6 shows a process of changing an associative array corresponding to the left branch in FIG. 5. With reference to FIG. 5 and FIG. 6, when A3=3 is read in step S51, A3 is changed from 3 to 5 through an atomic comparative change in step S52. As shown in FIG. 6, after A3 is changed to 5, an association relationship between transaction 3 and transaction 5 (as indicated by an arrow from A3 to A5) is represented, and the association relationship between transaction 2 and transaction 3 (as indicated by an arrow from A2 to A3) is recorded in A2, which is equivalent to having recorded an association relationship between transaction 2 and transaction 5.

Figure 7:
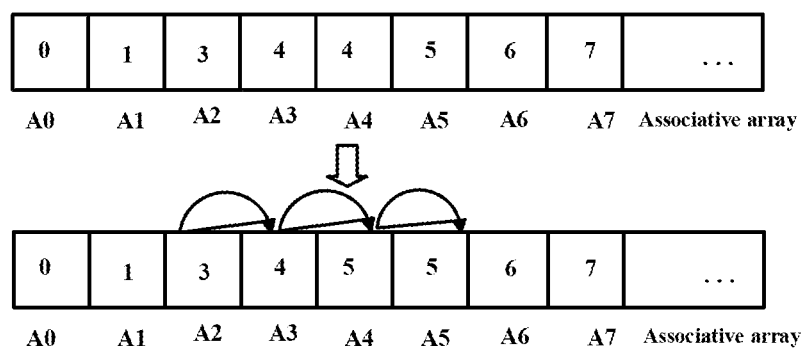
FIG. 7 shows a process of changing an associative array corresponding to the middle branch in FIG. 5.

FIG. 7 shows a process of changing an associative array corresponding to the middle branch in FIG. 5. With reference to FIG. 5 and FIG. 7, when A3=4 is determined in step S51, the value of variable A4 in the associative array is read in step S53, and when A4=4 is read, A4 is changed from 4 to 5 through an atomic comparative change in step S54. As shown in FIG. 7, after A4 is changed to 5, an association relationship between transaction 4 and transaction 5 (as indicated by an arrow from A4 to A5) is represented, the association relationship between transaction 2 and transaction 3 is recorded in A2, and an association relationship between transaction 3 and transaction 4 is recorded in A3, which is equivalent to having recorded an association relationship between transaction 2 and transaction 5.

Figure 8:
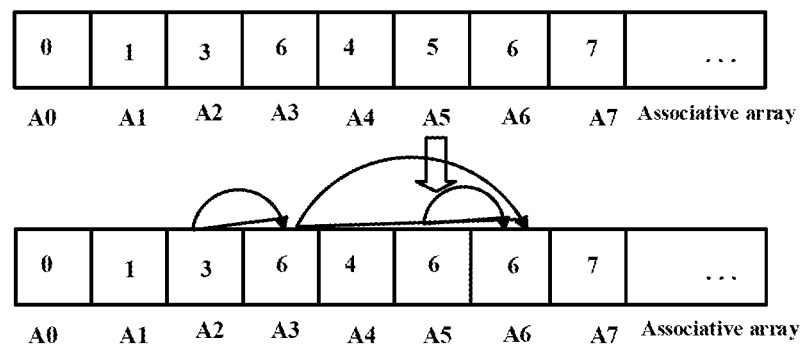
FIG. 8 shows a process of changing an associative array corresponding to the right branch in FIG. 5.

FIG. 8 shows a process of changing an associative array corresponding to the right branch in FIG. 5. With reference to FIG. 5 and FIG. 8, when A3=6 is determined in step S51, that is, transaction 3 is associated with transaction 6, the association between transaction 5 and transaction 6 needs to be recorded subsequently. In step S55, A5 is changed from 5 to 6 through an atomic comparative change. As shown in FIG. 8, after A5 is changed to 6, an association relationship between transaction 5 and transaction 6 (as indicated by an arrow from A5 to A6) is represented, the association relationship between transaction 2 and transaction 3 (as indicated by an arrow from A2 to A3) is recorded in A2, and an association relationship between transaction 3 and transaction 6 (as indicated by an arrow from A3 to A6) is recorded in A3, which is equivalent to having recorded an association relationship between transaction 2 and transaction 5.

In another situation, in step S2108 in FIG. 2, the atomic comparative change to A2 fails. In other words, when the atomic comparative change is performed, the value of A2 is not 2, but is changed to another value. In this case, similar to the above, the associative array can be changed with reference to the process shown in FIG. 5.

In another situation, each atomic comparative change step in FIG. 5 may fail, which indicates that the value of an associated variable changed through an atomic comparative change is not the numbering value of a transaction corresponding to the associated variable, but the numbering value of an associated transaction of the corresponding transaction. Therefore, an association relationship between the associated transaction and transaction 5 can be recorded in the associative array in a process similar to that shown in FIG. 5, so as to record the association relationship between transaction 2 and transaction 5.

In another implementation, after step S2103, step S2106 can be performed to change B2 from 2 to 5 through an atomic comparative change, to indicate that variable k2 belongs to transaction 5 or an associated transaction of transaction 5. Through the change, because an associated transaction with a larger transaction numbering value is recorded in an associated variable corresponding to each transaction, when transactions are grouped, a larger numbering value of an associated transaction of a transaction indicates a smaller association relationship between the transaction and the largest transaction, and therefore, the transaction can be grouped into a group where the largest transaction falls during transaction grouping. Therefore, changing a transaction numbering value of a belonging variable in the associative array to a larger transaction numbering value of the group makes transactions be grouped more quickly.

When the change to variable B2 in step S2106 fails, it indicates that the value of variable B2 has been changed to another value before the change. For example, if the value of B2 is changed to 3, the atomic comparative change can be performed on B2 again to change B2 from 3 to 5. In another situation, for example, if the value of B2 is changed to 7, the value of B2 is already greater than 5, and therefore, the value of B2 does not need to be changed to 5.

Figure 9:
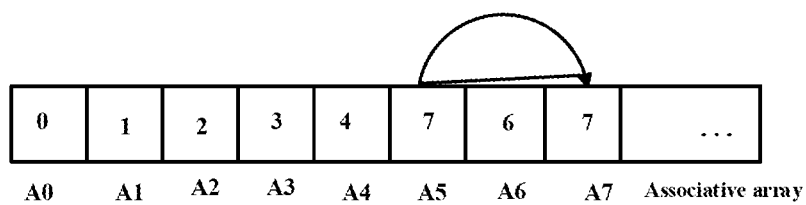
FIG. 9 is a schematic diagram illustrating an associative array after step S2105 is successfully performed.

Referring back to FIG. 2, after step S2108 is successfully performed for variable k2, the thread goes back to step S204 to continue to obtain variable k3 in transaction 5, performs step S206 to read the value (i.e., $b_{31}$) 7 of variable B3, and performs step S208 to read the value (i.e., $a_{51}$) of A5. Assume that the value of A5 is still 5. In step S2103, because $b_{31}=7>a_{51}=5$, step S2104 is performed to determine whether $a_{51}$ is equal to 5. When $a_{51}=5$ is determined, step S2105 is performed to change A5 from 5 to 7 through an atomic comparative change. FIG. 9 is a schematic diagram illustrating an associative array after step S2105 is successfully performed. As shown in FIG. 9, 7 is recorded in A5 to indicate the association between transaction 5 and transaction 7 (as indicated by an arrow from A5 to A7 in FIG. 9).

When $a_{51}$ is not equal to 5 in step S2104, or when the change in step S2105 fails, that is, the value of A5 indicates that transaction 5 is associated with another transaction, an association relationship between the another transaction and transaction 7 needs to be recorded in the associative array. A method for recording can be similar to the process shown in FIG. 5. Details are omitted herein for simplicity.

As described above, after the multiple threads process each variable in the multiple transactions, association relationships between the multiple transactions are recorded in the associative array, so that the multiple transactions can be grouped based on the association relationships, and associated transactions can be grouped into the same group. For example, referring to FIG. 7, it can be seen that transaction 2 is associated with transaction 3, transaction 3 is associated with transaction 4, and transaction 4 is associated with transaction 5. Therefore, transaction 2, transaction 3, transaction 4, and transaction 5 are associated with each other and can be grouped into one group. For another example, referring to FIG. 8, transaction 2 is associated with transaction 3, transaction 3 is associated with transaction 6, and transaction 5 is associated with transaction 6. Therefore, transaction 2, transaction 3, transaction 5, and transaction 6 are associated with each other and can be grouped into one group.

Figure 10:
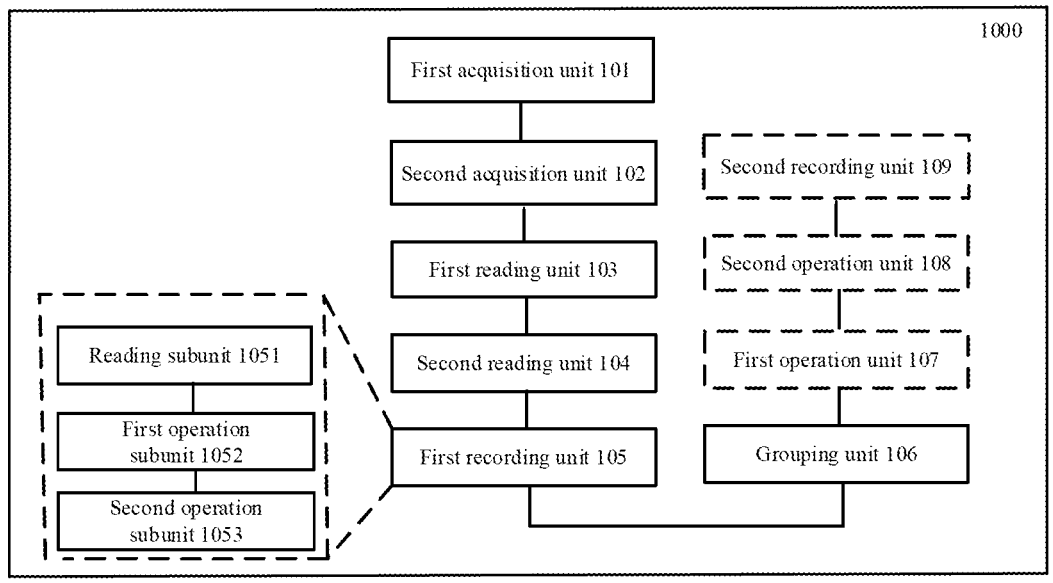
FIG. 10 shows an apparatus 1000 for grouping transactions in a blockchain according to an implementation of the present specification.

FIG. 10 shows an apparatus 1000 for grouping transactions in a blockchain according to an implementation of the present specification. The apparatus 1000 includes: a first acquisition unit 101, configured to obtain a first transaction in multiple transactions; a second acquisition unit 102, configured to obtain a first variable accessed in the first transaction; a first reading unit 103, configured to read a first value of a first associated variable corresponding to the first variable, the first associated variable being stored in a shared memory and being configured to record a numbering value of a transaction associated with a transaction to which the first variable belongs; a second reading unit 104, configured to read a first value of a first associated variable corresponding to the first transaction, the first associated variable being an atomic variable included in an associative array, the associative array including multiple atomic variables respectively corresponding to the multiple transactions and being stored in the shared memory, and the first associated variable being configured to record a numbering value of a transaction associated with the first transaction; a first recording unit 105, configured to: if the first value of the first belonging variable is a numbering value of a second transaction in the multiple transactions, record an association relationship between the first transaction and the second transaction in the associative array by performing an atomic comparative change operation on an atomic variable in the associative array based on the first value of the first belonging variable and the first value of the first associated variable; and a grouping unit 106, configured to group the multiple transactions based on the associative array.

In an implementation, the first belonging variable is an atomic variable, and the apparatus 1000 further includes a first operation unit 107, configured to: if the first value of the first belonging variable is a predetermined null value, perform atomic operations including: reading a second value of the first belonging variable; changing a value of the first belonging variable to the first value of the first associated variable if the second value of the first belonging variable is the predetermined null value; and returning the second value of the first belonging variable if the second value of the first belonging variable is not the predetermined null value.

In an implementation, the first recording unit 105 includes: a reading subunit 1051, configured to read a first value of a second associated variable corresponding to the second transaction if the first value of the first associated variable is greater than the first value of the first belonging variable; and a first operation subunit 1052, configured to: if the first value of the second associated variable is the numbering value of the second transaction, perform atomic operations including: reading a second value of the second associated variable; changing a value of the second associated variable to the first value of the first associated variable if the second value of the second associated variable is the numbering value of the second transaction; and returning the second value of the second associated variable if the second value of the second associated variable is not the numbering value of the second transaction.

In an implementation, the apparatus 1000 further includes a second operation unit 108, configured to: if the first value of the first associated variable is greater than the first value of the first belonging variable, perform atomic operations including: reading a third value of the first belonging variable; changing a value of the first belonging variable to the first value of the first associated variable if the third value of the first belonging variable is the first value of the first belonging variable; and returning the third value of the first belonging variable if the third value of the first belonging variable is not the first value of the first associated variable.

In an implementation, the first recording unit 105 includes a second operation subunit 1053, configured to: if the first value of the first associated variable is less than the first value of the first belonging variable, and if the first value of the first associated variable is a numbering value of the first transaction, perform atomic operations including: reading a second value of the first associated variable; changing a value of the first associated variable to the numbering value of the second transaction if the second value of the first associated variable is the numbering value of the first transaction; and returning the second value of the first associated variable if the second value of the first associated variable is not equal to the numbering value of the first transaction.

In an implementation, the second value of the first associated variable is a numbering value of a third transaction, and the apparatus 1000 further includes a second recording unit 109, configured to record an association between the third transaction and the second transaction in the associative array by performing an atomic comparative change operation on an atomic variable in the associative array based on the second value of the first associated variable and the first value of the first belonging variable.

An aspect of the present specification provides a computer-readable storage medium. The computer-readable storage medium stores computer programs, and a computer performs any one of the above methods when the computer programs are executed on the computer.

An aspect of the present specification provides a computing device, including a storage and a processor. The storage stores executable code, and the processor implements any one of the above methods when executing the executable code.

In the solution for grouping transactions in a blockchain according to the implementations of the specification, multiple threads can concurrently change a belonging array and an associative array in a lock-free way, so that multiple transactions can be grouped based on the associative array. In this process, no search for a complex data structure is involved, and the full advantage of multi-CPU performance can be taken.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 11:
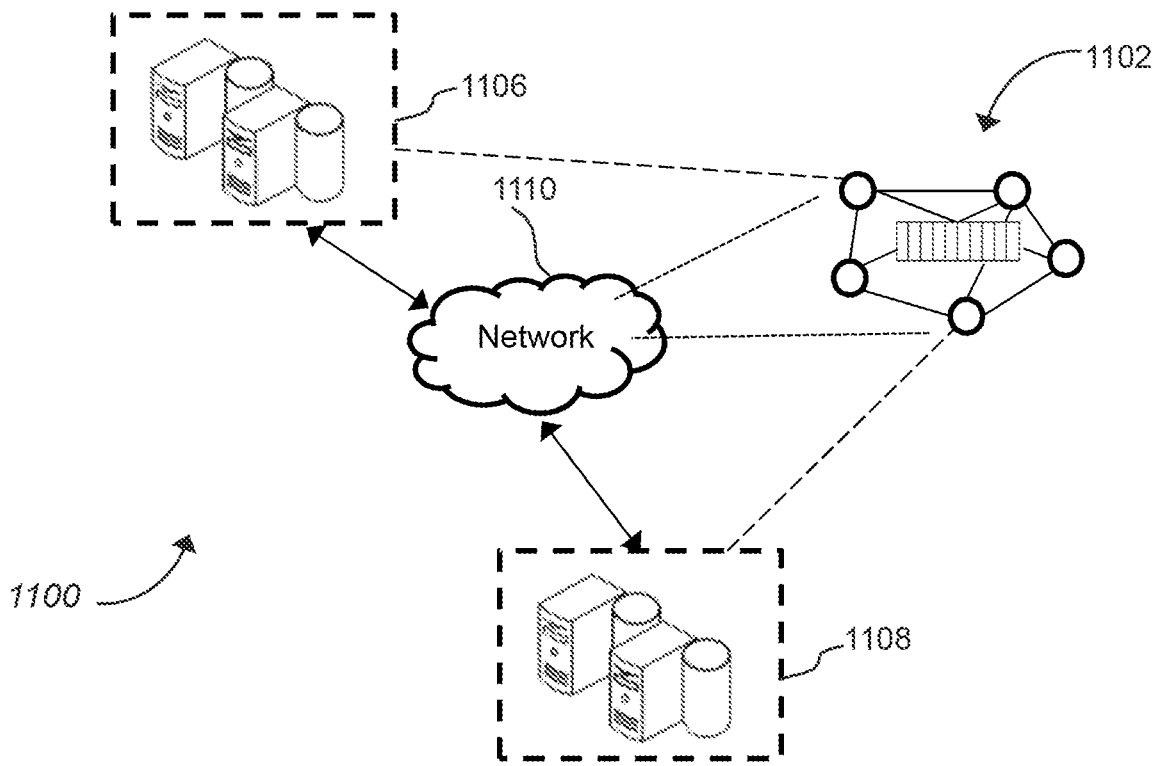
FIG. 11 is a diagram illustrating example environments that can be used to execute embodiments of this specification.

FIG. 11 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 11, the consortium blockchain network 1102 is represented as a peer-to-peer network of nodes, and the computing systems 1106, 1108 provide nodes of the first entity and second entity, respectively, which participate in the consortium blockchain network 1102.

Figure 12:
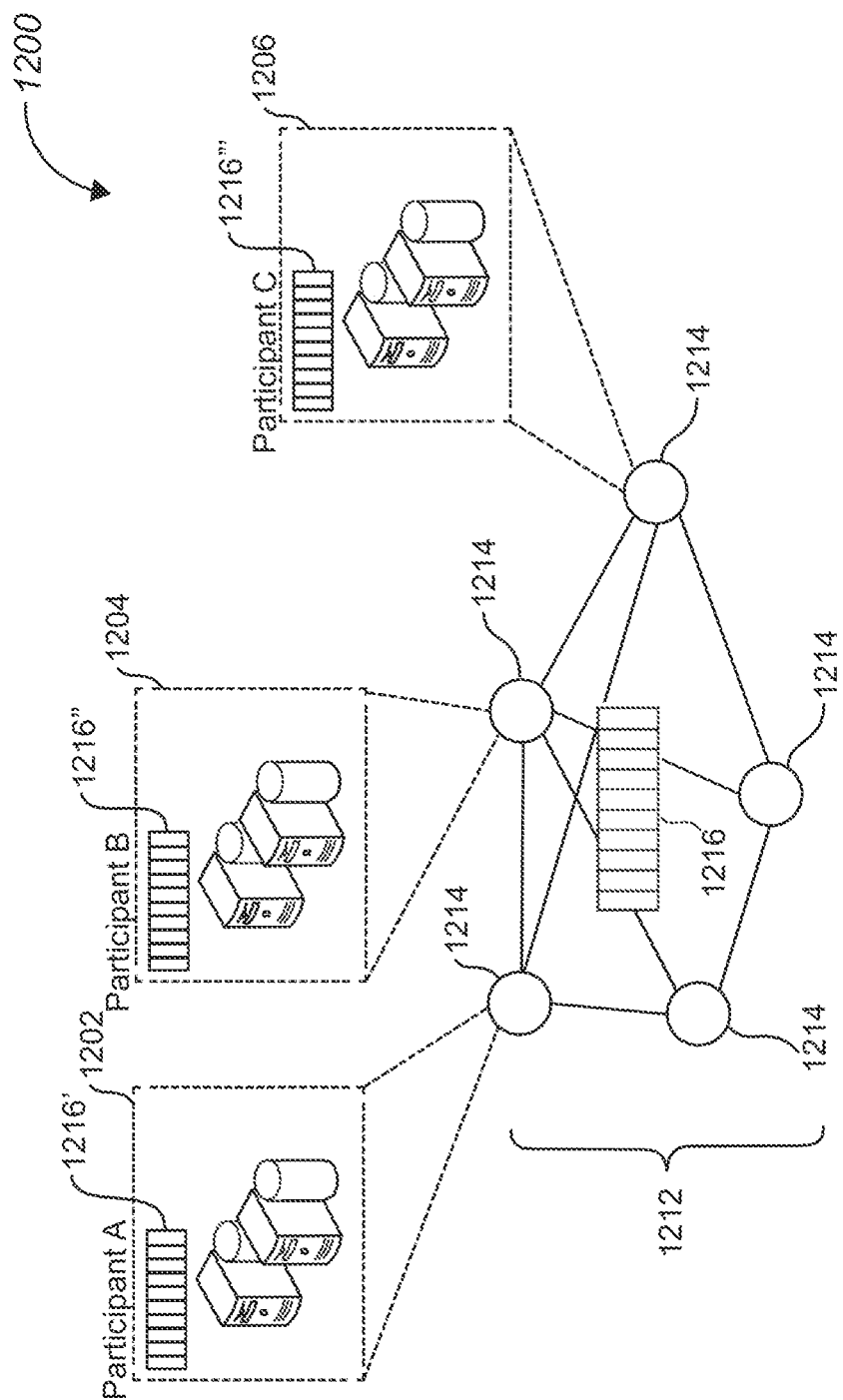
FIG. 12 is a diagram illustrating an example architecture in accordance with embodiments of this specification.

FIG. 12 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 12, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 12, the participant systems 1202, 1204 store respective, complete copies 1216', 1216'', 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes," The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 12, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 12, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 12, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

It should be understood that descriptions such as "first" and "second" in the present specification are merely intended to distinguish between similar concepts for the simplicity of description, and are not restrictive.

The implementations of the present specification are described in a progressive way. For same or similar parts of the implementations, references can be made to the implementations. Each implementation focuses on a difference from other implementations. For example, a system implementation is basically similar to a method implementation, and therefore, is described briefly. For related parts, references can be made to related descriptions in the method implementation.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily require a particular execution order to achieve the desired results. In some implementations, multi-tasking and parallel processing can be advantageous.

A person of ordinary skill in the art should be further aware that, in combination with the examples described in the implementations disclosed in the present specification, units and algorithm steps can be implemented by electronic hardware, computer software, or a combination thereof. To clearly describe interchangeability between the hardware and the software, compositions and steps of each example are described above based on functions. Whether the functions are performed by hardware or software depends on particular applications and design constraint conditions of the technical solutions. A person of ordinary skill in the art can use different methods to implement the described functions for each particular application, but it should not be considered that the implementation goes beyond the scope of the present application. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described specific implementations, the objective, technical solutions, and benefits of the present disclosure are further described in detail. It should be understood that the descriptions are merely specific implementations of the present disclosure, but are not intended to limit the protection scope of the present disclosure. Any modification, equivalent replacement, or improvement made without departing from the spirit and principle of the present disclosure should fall within the protection scope of the present disclosure.

The various embodiments described above can be combined to provide further embodiments. Aspects of the embodiments can be modified, if necessary, to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for grouping transactions in a blockchain, comprising:
by a node device of the blockchain:
obtaining a first transaction in multiple transactions;
obtaining a first variable accessed in the first transaction;
reading a first value of a first belonging variable corresponding to the first variable, the first belonging variable being stored in a shared memory and being configured to record a numbering value of a transaction associated with a transaction to which the first variable belongs;
reading a first value of a first associated variable corresponding to the first transaction, the first associated variable being an atomic variable included in an associative array, the associative array including multiple atomic variables respectively corresponding to the multiple transactions and being stored in the shared memory, and the first associated variable being configured to record a numbering value of a transaction associated with the first transaction;
in response to the first value of the first belonging variable being a numbering value of a second transaction in the multiple transactions, recording an association relationship between the first transaction and the second transaction in the associative array by performing an atomic comparative change operation on an atomic variable in the associative array based on the first value of the first belonging variable and the first value of the first associated variable; and
grouping the multiple transactions based on the associative array.

2. The method according to claim 1, wherein the first belonging variable is an atomic variable, and the method comprises:
in response to the first value of the first belonging variable being a determined null value, performing atomic operations including:
reading a second value of the first belonging variable;
changing a value of the first belonging variable to the first value of the first associated variable in response to the second value of the first belonging variable being the determined null value; and
returning the second value of the first belonging variable in response to the second value of the first belonging variable not being a predetermined null value.

3. The method according to claim 1, wherein the performing the atomic comparative change operation on the atomic variable in the associative array based on the first value of the first belonging variable and the first value of the first associated variable includes:
reading a first value of a second associated variable corresponding to the second transaction in response to the first value of the first associated variable being greater than the first value of the first belonging variable, and
in response to the first value of the second associated variable being the numbering value of the second transaction, performing atomic operations including:
reading a second value of the second associated variable;
changing a value of the second associated variable to the first value of the first associated variable in response to the second value of the second associated variable being the numbering value of the second transaction; and
returning the second value of the second associated variable in response to the second value of the second associated variable not being the numbering value of the second transaction.

4. The method according to claim 3, comprising:
in response to the first value of the first associated variable being greater than the first value of the first belonging variable, performing atomic operations including:
reading a third value of the first belonging variable;
changing a value of the first belonging variable to the first value of the first associated variable in response to the third value of the first belonging variable being the first value of the first belonging variable; and
returning the third value of the first belonging variable in response to the third value of the first belonging variable not being the first value of the first associated variable.

5. The method according to claim 1, wherein the performing the atomic comparative change operation on the atomic variable in the associative array based on the first value of the first belonging variable and the first value of the first associated variable includes:
in response to the first value of the first associated variable being less than the first value of the first belonging variable, and the first value of the first associated variable being a numbering value of the first transaction, performing atomic operations including:
reading a second value of the first associated variable;
changing a value of the first associated variable to the numbering value of the second transaction in response to the second value of the first associated variable being equal to the numbering value of the first transaction; and
returning the second value of the first associated variable in response to the second value of the first associated variable not being equal to the numbering value of the first transaction.

6. The method according to claim 5, wherein the second value of the first associated variable is a numbering value of a third transaction, the method comprising:
after the second value of the first associated variable has been returned, recording an association between the third transaction and the second transaction in the associative array by performing an atomic comparative change operation on an atomic variable in the associative array based on the second value of the first associated variable and the first value of the first belonging variable.

7. An apparatus for grouping transactions in a blockchain, comprising:
a first acquisition unit, configured to obtain a first transaction in multiple transactions;
a second acquisition unit, configured to obtain a first variable accessed in the first transaction;
a first reading unit, configured to read a first value of a first associated variable corresponding to the first variable, the first associated variable being stored in a shared memory and being configured to record a numbering value of a transaction associated with a transaction to which the first variable belongs;
a second reading unit, configured to read a first value of a first associated variable corresponding to the first transaction, the first associated variable being an atomic variable included in an associative array, the associative array including multiple atomic variables respectively corresponding to the multiple transactions and being stored in the shared memory, and the first associated variable being configured to record a numbering value of a transaction associated with the first transaction;
a first recording unit, configured to, in response to the first value of a first belonging variable being a numbering value of a second transaction in the multiple transactions, record an association relationship between the first transaction and the second transaction in the associative array by performing an atomic comparative change operation on an atomic variable in the associative array based on the first value of the first belonging variable and the first value of the first associated variable; and
a grouping unit, configured to group the multiple transactions based on the associative array.

8. The apparatus according to claim 7, wherein the first belonging variable is an atomic variable, and the apparatus comprises a first operation unit, configured to:
in response to the first value of the first belonging variable being a predetermined null value, perform atomic operations including:
reading a second value of the first belonging variable;
changing a value of the first belonging variable to the first value of the first associated variable in response to the second value of the first belonging variable being the predetermined null value; and
returning the second value of the first belonging variable in response to the second value of the first belonging variable not being the predetermined null value.

9. The apparatus according to claim 7, wherein the first recording unit includes:
a reading subunit, configured to read a first value of a second associated variable corresponding to the second transaction in response to the first value of the first associated variable being greater than the first value of the first belonging variable; and
a first operation subunit, configured to, in response to the first value of the second associated variable being the numbering value of the second transaction, perform atomic operations including:
reading a second value of the second associated variable;
changing a value of the second associated variable to the first value of the first associated variable in response to the second value of the second associated variable being the numbering value of the second transaction; and
returning the second value of the second associated variable in response to the second value of the second associated variable not being the numbering value of the second transaction.

10. The apparatus according to claim 9, comprising a second operation unit, configured to:
in response to the first value of the first associated variable being greater than the first value of the first belonging variable, perform atomic operations including:
reading a third value of the first belonging variable;
changing a value of the first belonging variable to the first value of the first associated variable in response to the third value of the first belonging variable being the first value of the first belonging variable; and
returning the third value of the first belonging variable in response to the third value of the first belonging variable not being the first value of the first associated variable.

11. The apparatus according to claim 7, wherein the first recording unit includes a second operation subunit, configured to:
in response to the first value of the first associated variable being less than the first value of the first belonging variable, and in response to the first value of the first associated variable being a numbering value of the first transaction, perform atomic operations including:
reading a second value of the first associated variable;
changing a value of the first associated variable to the numbering value of the second transaction in response to the second value of the first associated variable being equal to the numbering value of the first transaction; and
returning the second value of the first associated variable in response to the second value of the first associated variable not being equal to the numbering value of the first transaction.

12. The apparatus according to claim 11, wherein the second value of the first associated variable is a numbering value of a third transaction, and the apparatus comprises a second recording unit, configured to record an association between the third transaction and the second transaction in the associative array by performing an atomic comparative change operation on an atomic variable in the associative array based on the second value of the first associated variable and the first value of the first belonging variable.

13. A non-transitory computer-readable storage medium storing executable instructions, the executable instructions, when executed by a processor, configure the processor to implement acts including:
   obtaining a first transaction in multiple transactions in a blockchain;
   obtaining a first variable accessed in the first transaction;
   reading a first value of a first belonging variable corresponding to the first variable, the first belonging variable being stored in a shared memory and being configured to record a numbering value of a transaction associated with a transaction to which the first variable belongs;
   reading a first value of a first associated variable corresponding to the first transaction, the first associated variable being an atomic variable included in an associative array, the associative array including multiple atomic variables respectively corresponding to the multiple transactions and being stored in the shared memory, and the first associated variable being configured to record a numbering value of a transaction associated with the first transaction;
   in response to the first value of the first belonging variable being a numbering value of a second transaction in the multiple transactions, recording an association relationship between the first transaction and the second transaction in the associative array by performing an atomic comparative change operation on an atomic variable in the associative array based on the first value of the first belonging variable and the first value of the first associated variable; and
   grouping the multiple transactions based on the associative array.

14. The storage medium according to claim 13, wherein the first belonging variable is an atomic variable, and the acts include:
   in response to the first value of the first belonging variable being a determined null value, performing atomic operations including:
      reading a second value of the first belonging variable;
      changing a value of the first belonging variable to the first value of the first associated variable in response to the second value of the first belonging variable being the determined null value; and
      returning the second value of the first belonging variable in response to the second value of the first belonging variable not being a predetermined null value.

15. A computing device, comprising a storage and a processor, the storage storing executable instructions, which when executed by the processor enable the processor to implement acts including:
   obtaining a first transaction in multiple transactions in a blockchain;
   obtaining a first variable accessed in the first transaction;
   reading a first value of a first belonging variable corresponding to the first variable, the first belonging variable being stored in a shared memory and being configured to record a numbering value of a transaction associated with a transaction to which the first variable belongs;
   reading a first value of a first associated variable corresponding to the first transaction, the first associated variable being an atomic variable included in an associative array, the associative array including multiple atomic variables respectively corresponding to the multiple transactions and being stored in the shared memory, and the first associated variable being configured to record a numbering value of a transaction associated with the first transaction;
   in response to the first value of the first belonging variable being a numbering value of a second transaction in the multiple transactions, recording an association relationship between the first transaction and the second transaction in the associative array by performing an atomic comparative change operation on an atomic variable in the associative array based on the first value of the first belonging variable and the first value of the first associated variable; and
   grouping the multiple transactions based on the associative array.

16. The device according to claim 15, wherein the first belonging variable is an atomic variable, and the acts include:
   in response to the first value of the first belonging variable being a determined null value, performing atomic operations including:
      reading a second value of the first belonging variable;
      changing a value of the first belonging variable to the first value of the first associated variable in response to the second value of the first belonging variable being the determined null value; and
      returning the second value of the first belonging variable in response to the second value of the first belonging variable not being a predetermined null value.

17. The device according to claim 15, wherein the performing the atomic comparative change operation on the atomic variable in the associative array based on the first value of the first belonging variable and the first value of the first associated variable includes:
   reading a first value of a second associated variable corresponding to the second transaction in response to the first value of the first associated variable being greater than the first value of the first belonging variable, and
   in response to the first value of the second associated variable being the numbering value of the second transaction, performing atomic operations including:
      reading a second value of the second associated variable;
      changing a value of the second associated variable to the first value of the first associated variable in response to the second value of the second associated variable being the numbering value of the second transaction; and
      returning the second value of the second associated variable in response to the second value of the second associated variable not being the numbering value of the second transaction.

18. The device according to claim 17, wherein the acts include:
   in response to the first value of the first associated variable being greater than the first value of the first belonging variable, performing atomic operations including:
      reading a third value of the first belonging variable;
      changing a value of the first belonging variable to the first value of the first associated variable in response to the third value of the first belonging variable being the first value of the first belonging variable; and returning the third value of the first belonging variable in response to the third value of the first belonging variable not being the first value of the first associated variable.

19. The device according to claim 15, wherein the performing the atomic comparative change operation on the atomic variable in the associative array based on the first value of the first belonging variable and the first value of the first associated variable includes:

in response to the first value of the first associated variable being less than the first value of the first belonging variable, and the first value of the first associated variable being a numbering value of the first transaction, performing atomic operations including:

reading a second value of the first associated variable;

changing a value of the first associated variable to the numbering value of the second transaction in response to the second value of the first associated variable being equal to the numbering value of the first transaction; and returning the second value of the first associated variable in response to the second value of the first associated variable not being equal to the numbering value of the first transaction.

20. The device according to claim 19, wherein the second value of the first associated variable is a numbering value of a third transaction, the acts including:

after the second value of the first associated variable has been returned, recording an association between the third transaction and the second transaction in the associative array by performing an atomic comparative change operation on an atomic variable in the associative array based on the second value of the first associated variable and the first value of the first belonging variable.

* * * * *